Patented Aug. 15, 1950

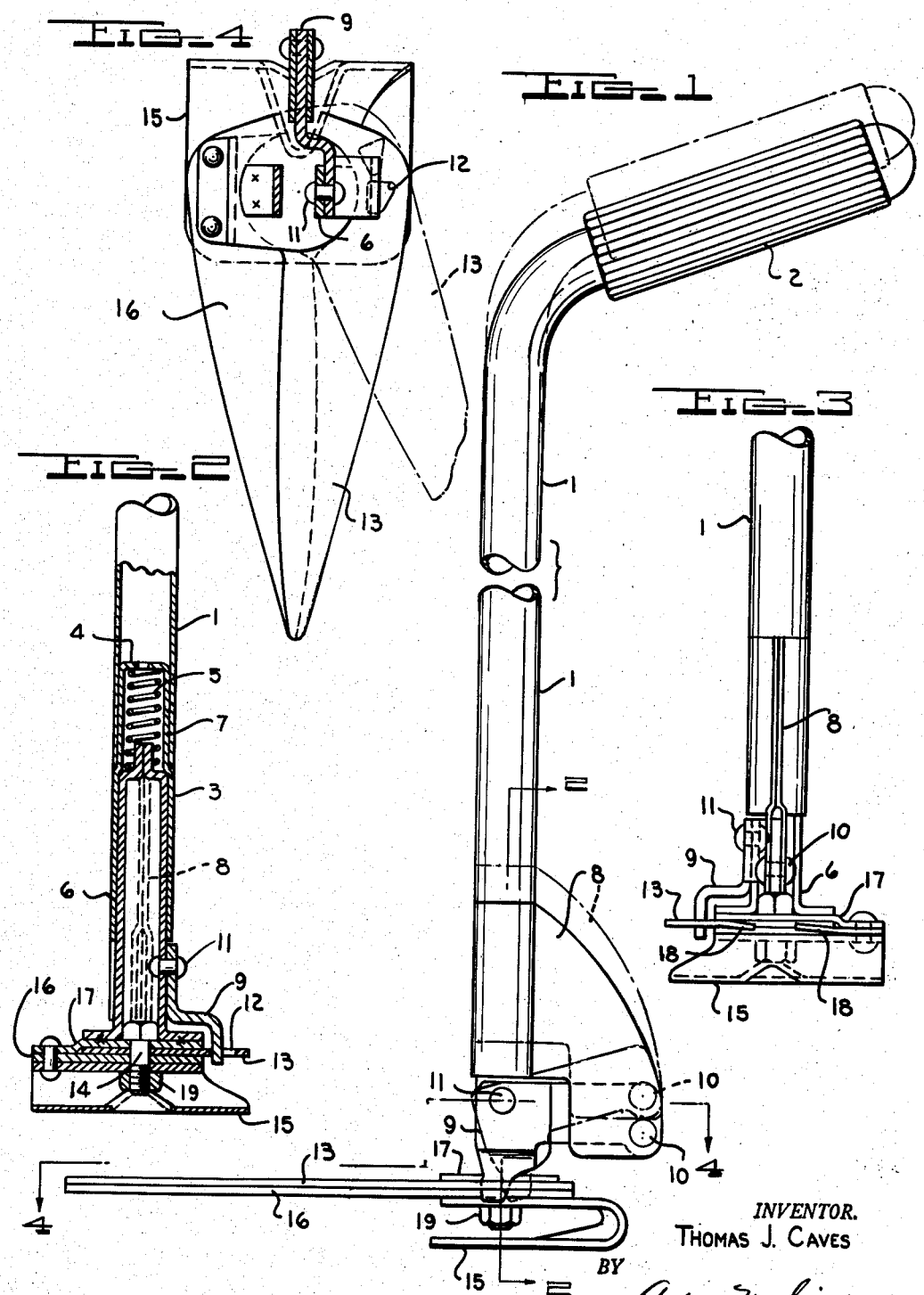

2,519,175

UNITED STATES PATENT OFFICE 2,519,175

LAWN SHEARS

Thomas J. Caves, Dearborn, Mich.

Application April 1, 1948, Serial No. 18,371

2 Claims. (Cl. 56—241)

The present invention relates to lawn shears which are particularly adapted for cutting grass, weeds, and the like.

The principal object of the present invention is the provision of simple and practical lawn shears designed and adapted to enable the user to assume a comfortable upright position while operating the shears, to the end that the work of cutting may be performed readily and efficiently with a minimum of discomfort to the user.

Another object of the present invention is to provide grass shears which are convenient to use, positive in their operation, and which are so designed that they may be readily manufactured at a relatively low cost by mass production methods.

A further object of the present invention is to provide lawn shears of simple and durable construction which have a relatively long life in service and in which any part is readily replaceable in the event of breakage or bending of the parts so that it will not perform its intended function.

Another object of the present invention is to provide a lawn shear device adapted for cutting weeds or grass adjacent obstructions, such lawn shear device having a fixed blade and a pivotally mounted movable blade operatively connected with operating means for moving the movable blade upon exertion of a downward pressure on the elongated handle.

In the drawings:

Fig. 1 is a side elevation of a pair of lawn shears embodying the present invention showing the shear blades in closed position at the end of the cutting stroke.

Fig. 2 is a section taken substantially on the line 2—2 in the direction of the arrows, Fig. 1.

Fig. 3 is a rear elevation of the present invention with the top part of the handle member not shown.

Fig. 4 is a section taken on the staggered line 4—4 in the direction of the arrows, Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The lawn shears of the present invention include a tubular handle member 1 slightly bent at the upper end and equipped with a rubber grip 2. In the drawings, the solid lines show the positions of the respective parts when a force is exerted downwardly on the handle 1 to close the shear blades. The dotted lines indicate the positions of the parts when the downwardly exerted force is released on the handle. At the lower end of the handle member 1, a housing 3 is provided which extends downwardly below the handle member 1 and which also extends upwardly inside the handle member 1. The top of the tubular housing 3 is provided with inturned lugs 4 which form a seat for the upper end of a compression spring 5. The lower end of the spring 5 is seated on top of two identical vertical rigid brackets 6 around the pilot 7 formed by the upper ends of the said brackets 6. A force applying member 8 is fitted to the housing 3 and in turn is connected to the bell crank shear activating lever 9 by a rivet 10. The bell crank lever 9 is pivotally fastened to the vertical rigid brackets 6 by means of a rivet 11.

The bell crank lever 9 fits into a slot 12 in a movable shear blade 13. A central pivot bolt 14 extends through the top of a ground contacting plate 15, a fixed shear blade 16, the movable shear blade 13, and a retaining member 17. The retaining member 17 is welded to the pair of vertical rigid brackets 6.

To operate the lawn shears of the present invention, assuming the downwardly exerted pressure on the handle 1 has been released and the shear blade 13 and handle 1 are in the position indicated by the dotted lines, the ground contacting plate 15 is placed on the ground and a force is exerted downward on the handle member 1 and transmitted to the housing 3 which is fitted within the said handle member. The ground surface provides a reaction force against the ground contacting plate 15 and the tubular handle member 1 and housing 3 slide vertically downward along the pair of vertical rigid brackets 6 thus compressing the spring 15. This downward force is also transmitted through the force applying member 8 to the bell crank lever 9 and the lever pivots about the rivet 11, the lug at the lower end of the bell crank lever 9 which fits in the slot 12 in the movable shear blade 13 at the same time effecting the pivotal movement of the movable shear blade 13 about the central pivot bolt 14. This action causes the movable shear blade 13 to pivot toward the cutting edge of the fixed shear blade 16. The desired cutting action is provided when the cutting edge of the movable blade 13 is moved across the cutting edge of the fixed blade 16.

Upon removing the downward force from the handle member 1, the spring 5 returns to its initial position thus forcing the housing 3 and handle member 1 vertically upward to their original positions. The force applying member 8 is raised, the bell crank lever 9 is pivoted about the rivet 11, in the opposite direction, the lever lug moves backward, and the movable shear blade 13 is pivoted away from the fixed shear blade 16. The rear portions of the blades are slightly bent to form stops 18 which are in contact when the blades are in the inoperative or open position.

An important feature of the present construction is the provision of one fixed and one pivotal shear blade. With lawn shears embodying the present invention it is possible to cut the grass adjacent walls, fences, and like rigid obstructions by placing the fixed shear blade along the obstruction and exerting a downward force on the handle member. The movable shear blade 13 is brought into cutting position with the fixed shear blade 16 without necessitating movement of the fixed blade 16. This is an obvious advantage over constructions embodying two movable shear blades.

Another obvious advantage is that all of the cutting force is applied to the one movable blade without changing the placement or position of the fixed blade.

The blades 6 and 7 are preferably stamped from sheet metal stock and then hardened. Utilizing this construction, the cutting edges may be readily sharpened and when so sharpened will be found to hold their cutting edge during long periods of use.

From the foregoing it will be seen that all parts of the lawn shears and the operating mechanism therefor are designed for ready construction and ease of assembly in mass production. This construction provides a conveniently usable device which is readily operable with a minimum of effort exerted by the user.

I claim:

1. Lawn shears comprising a ground contacting plate, a vertically disposed rigid bracket member secured at its lower end to said ground contacting plate, a fixed blade secured between said ground contacting plate and said bracket member, a movable blade pivotally mounted between said ground contacting plate and said bracket member for pivotal movement with respect to said fixed blade, said movable blade having a slot therein spaced radially from the point of pivotal movement thereof, a housing mounted about the upper end of said bracket member and vertically movable relative thereto, a coil spring seated at its one end on said bracket member and at its other end in said housing for biasing said housing vertically upward, a handle secured to said housing and extending vertically upward therefrom for moving said housing vertically downward in opposition to said coil spring, a bell crank lever pivotally connected at its fulcrum to said bracket member for movement in a vertical plane, a force applying member rigidly secured to said housing, one arm of said bell crank lever being pivotally connected to said force applying member, the other arm of said bell crank lever extending into said slot of said movable blade, said bell crank lever, force applying member and slot being so constructed and arranged that said one arm will be substantially normal to the path of vertical movement of said force applying member and said other arm will be substantially normal to the path of movement of said slot during closing and opening of said lawn shears.

2. In a lawn shears, a vertically disposed rigid bracket member, a fixed blade rigidly secured to the lower end of said bracket member, a movable blade pivotally mounted on the lower end of said bracket member for pivotal movement with respect to said fixed blade, said movable blade having a slot therein spaced radially from the point of pivotal movement thereof, a vertical force applying member operatively mounted on said bracket member for vertical movement with respect thereto, a bell crank lever pivotally connected at its fulcrum to said bracket member for movement in a vertical plane, the axis of pivotal movement of said bell crank lever extending in a second vertical plane which intersects the path of pivotal movement of said slot and is normal to said path at the point of intersection thereof, one arm of said bell crank lever being pivotally connected to said force applying member, the other arm of said bell crank lever extending into said slot of said movable blade, said bell crank lever, force applying member and slot being so constructed and arranged that said one arm will be substantially normal to a portion of the path of vertical movement of said force applying member and said other arm will be substantially normal to a portion of the path of movement of said slot during closing and opening of said lawn shears.

THOMAS J. CAVES.

REFERENCES CITED

The following references are of record in the file of this patent:

UNITED STATES PATENTS

| Number | Name | Date |
|---|---|---|
| 756,227 | Fisk | Apr. 5, 1904 |
| 1,222,950 | Heidl | Apr. 17, 1917 |
| 1,275,307 | Saile | Aug. 13, 1918 |
| 1,741,172 | Huxman | Dec. 31, 1929 |
| 1,799,087 | Carpenter | Mar. 31, 1931 |